United States Patent
Byggmästar

(10) Patent No.: US 6,923,555 B2
(45) Date of Patent: Aug. 2, 2005

(54) BULB HOLDER HAVING U-SHAPED GRIPPING JAWS AND ELECTRIC TERMINAL

(75) Inventor: Klas Byggmästar, Furuholmen (FI)

(73) Assignee: Oy B. Herrmans AB, Pietarsaari (FI)

(*) Notice: Subject to any disclaimer, the term of this patent is extended or adjusted under 35 U.S.C. 154(b) by 145 days.

(21) Appl. No.: 10/260,575

(22) Filed: Oct. 1, 2002

(65) Prior Publication Data

US 2003/0067788 A1 Apr. 10, 2003

(30) Foreign Application Priority Data

Oct. 10, 2001 (FI) .............................................. 20011971

(51) Int. Cl.[7] .................................................. H01R 4/48

(52) U.S. Cl. ........................ 362/226; 362/548; 362/549; 362/296; 362/396; 439/36; 403/338

(58) Field of Search .................................. 362/226, 548, 362/549, 296, 396, 257, 317, 341, 382, 459, 546, 457, 519, 487, 538, 368, 370; 439/36, 34, 347, 544; 403/335, 338; 315/49–51; 248/689, 301, 682, 300

(56) References Cited

U.S. PATENT DOCUMENTS

| 4,219,870 A | 8/1980 | Haraden et al. ............ 362/226 |
| 4,774,645 A | 9/1988 | Iwamooto ................... 362/226 |

*Primary Examiner*—John Anthony Ward
*Assistant Examiner*—Ismael Negron
(74) *Attorney, Agent, or Firm*—Burns, Doane, Swecker & Mathis, L.L.P.

(57) ABSTRACT

A holder for a light bulb, wherein the bulb is connected to a reflector, for example for vehicular lamps. The reflector has its rear provided with brackets of such a configuration that a cap flange of the bulb, and recesses present therein, fit in the brackets in such a way that the bulb sets in its position. The brackets are provided with opposing lips, against which the cap flange rests and the cap flange is securable to the lips by means of U-shaped gripping jaws of the holder.

5 Claims, 1 Drawing Sheet

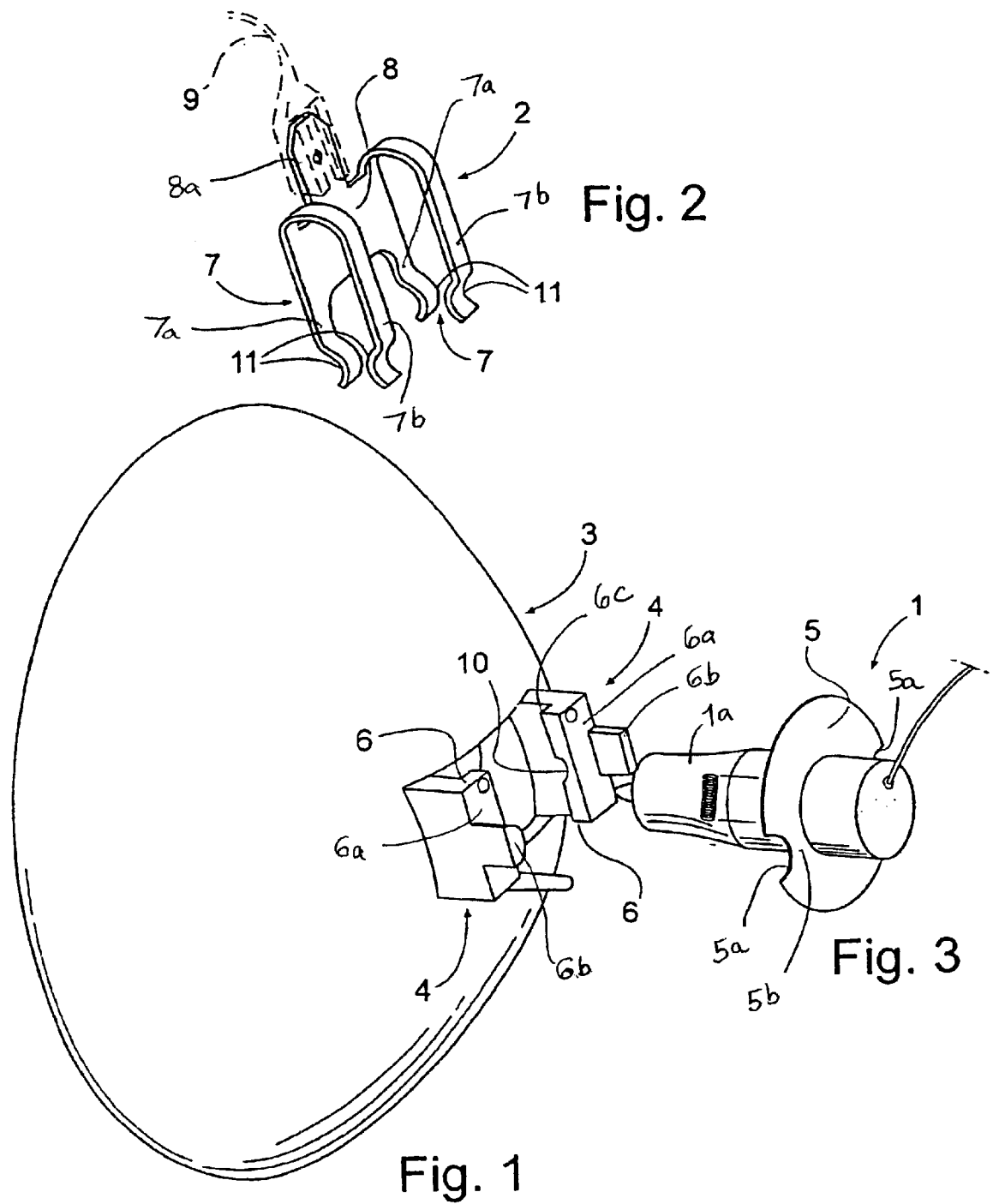

BULB HOLDER HAVING U-SHAPED GRIPPING JAWS AND ELECTRIC TERMINAL

BACKGROUND

The invention relates to a holder for a bulb, whereby the bulb is connected to a reflector for example for vehicular lamps and wherein the reflector has its rear provided with brackets of such a design that a cap flange of the bulb, and recesses present therein, fit in the brackets in such a way that the bulb sets in its position.

At present, bulbs are connected by means of various rotatable socket solutions, plates, and various hinged spring systems. All these prior known solutions are complicated, expensive and difficult to use. It is an object of the invention to provide a novel type of bulb holder, which is simple, economical and easy to use.

SUMMARY OF INVENTION

A holder of the invention is characterized in that the brackets are provided with opposing lips, against which the cap flange sets and is securable to the lips by means of U-shaped gripping jaws. This type of holder, whose jaws are further connected to each other with a web plate, to which is fastened a grounding wire by means of a bayonet coupling, is convenient in use and cannot fall down even if the grip is lost in the process of replacing the bulb. Since the lips are further provided with clamping recesses, wherein the complementary clamping prongs present in the clamp jaws fit in a locking position, the holder cannot get loose despite vibration. The reflector can be manufactured by compression molding from light metal, plastics, or sheet metal. The clamp jaws are made from flexible sheet metal.

BRIEF DESCRIPTION OF THE DRAWINGS

The invention will now be described by way of example with reference to the accompanying drawing, in which FIG. 1 shows, in perspective, a reflector for a vehicular lamp, FIG. 2 shows, in perspective, a holder, and FIG. 3 shows, in perspective, a bulb.

DESCRIPTION OF A PREFERRED EMBODIMENT

A holder 2 for a bulb 1 is used for connecting the bulb to a lamp reflector 3. The reflector 3 has its rear provided with brackets 4, designed in such a way that a cap flange 5 of the bulb and recesses 5a present therein fit in the brackets 4 so as to set the bulb in position. The brackets 4 are provided with opposing lips 6, against which the cap flange 5 sets and is securable to the lips 6 by means of U-shaped gripping jaws 7 of the holder 2. The gripping jaws 7 are connected to each other by means of a web plate 8 that includes an electric terminal 8a to which is attached a grounding wire 9 with a bayonet coupling. Front surfaces 6c of the lips 6 are provided with clamping recesses 10, with complementary clamping prongs 11 present in the gripping jaws 7 fitting therein in a locking position.

Thus, it will be appreciated that a front portion 1a of the bulb extends between the lips 6, and the cap flange 5 engages rear surfaces 6a of the lips. The recesses 5a of the cap flange receive respective projections 6b of the brackets. Each U-shaped gripping jaw 7 includes front and rear legs 7a, 7b. The front legs 7a engage the front surfaces 6c of the lips 6, and the rear legs 7b engage a rear surface 5b of the cap flange 5.

What is claimed is:

1. A light assembly comprising:

a reflector having a bracket extending from a rear end thereof, the bracket including a pair of lips each having front and rear surfaces, and a pair of projections;

a bulb including a front portion positioned and extending between the lips of the bracket, and a cap flange engaging the rear surface of the lips, the cap flange including a plurality of recesses, each of the recesses receiving a respective one of the projections of the bracket to prevent rotation of the bulb; and a holder for securing the bulb to the bracket, the holder comprising a pair of U-shaped gripping jaws interconnected by a web plate, each gripping jaw including front and rear legs, the front legs arranged to engage the front surfaces of respective lips of the bracket, the rear legs arranged to engage a rear surface of the cap flange, the holder further including an electric terminal adapted for receiving a power supply connector.

2. The light assembly according to claim 1 wherein the front surfaces of the lips include respective recesses, each of the front legs including a prong received in a respective recess.

3. The light assembly according to claim 1 wherein the power supply connector is a ground wire.

4. The light assembly according to claim 3 wherein the electric terminal is located on the web plate.

5. The light assembly according to claim 3 wherein the power supply connector is connected by a bayonet coupling.

* * * * *